US006965307B2

(12) United States Patent
Pearson, Jr. et al.

(10) Patent No.: US 6,965,307 B2
(45) Date of Patent: Nov. 15, 2005

(54) SIGN SENTRY

(76) Inventors: Joseph Pearson, Jr., 9818 Diversified La., Ellicott City, MD (US) 21042; Timothy J. Riley, 3721 Dance Mill Rd., Phoenix, MD (US) 21131

( * ) Notice: Subject to any disclaimer, the term of this patent is extended or adjusted under 35 U.S.C. 154(b) by 114 days.

(21) Appl. No.: 10/769,289

(22) Filed: Jan. 30, 2004

(65) Prior Publication Data

US 2004/0263340 A1    Dec. 30, 2004

Related U.S. Application Data

(60) Provisional application No. 60/444,483, filed on Jan. 31, 2003.

(51) Int. Cl.[7] ............................. B60Q 1/26; G05F 1/00
(52) U.S. Cl. ...................... 340/468; 340/469; 340/641; 315/291; 315/307
(58) Field of Search ............................... 340/468, 469, 340/3.51, 641; 315/291, 307

(56) References Cited

U.S. PATENT DOCUMENTS

| | | | |
|---|---|---|---|
| 4,466,208 A | 8/1984 | Logan, Jr. et al. | |
| 4,654,806 A | 3/1987 | Poyser et al. | |
| 5,119,412 A * | 6/1992 | Attallah | 379/102.07 |
| 5,680,286 A | 10/1997 | Pacholok | |
| 5,774,052 A | 6/1998 | Hamm et al. | |
| 6,028,597 A | 2/2000 | Ryan, Jr. et al. | |
| 6,400,277 B2 | 6/2002 | Guedes | |
| 6,441,565 B1 | 8/2002 | Levy | |
| 2001/0053055 A1 | 12/2001 | Guedes | |

OTHER PUBLICATIONS www.highliteslighting.com/power3.htm--product   HL-232 Diagnostic Interface Option.

* cited by examiner

Primary Examiner—Tuyet Thi Vo
(74) Attorney, Agent, or Firm—Law Offices of Royal W. Craig

(57) ABSTRACT

A Sign Sentry monitoring system for monitoring lighting. The Sign Sentry system includes a plurality of current sensors for inductively sensing current passing through each lighting circuit. The sign sentry system includes a monitoring panel mounted proximate the signage electrical panel (typically inside the building) which encloses a processor, memory, analog-to-digital transducers, and a modem (connected to a telephone line). A plurality of current sensors are deployed in the signage junction box and are connected from the junction box into the monitoring panel to transducers for converting the sensed current levels to digitized current levels. A software program sequentially polls the sensed current in each lighting circuit, and the current levels are compared to predetermined daytime and nighttime thresholds. If a fault condition is detected the processor generates and stores an error code in memory, the fault code comprising an indication of the site, affected lighting circuit, and nature of the fault. The processor then activates the modem to dial a central monitoring station and transmit the error code, whereby the fault can be reported out to responsible persons by telephone, voice mail, pagers, email and/or voice email.

9 Claims, 7 Drawing Sheets

SIGN SENTRY

CROSS-REFERENCE TO RELATED APPLICATIONS

The present application derives priority from provisional application No. 60/444,483 filed Jan. 31, 2003.

BACKGROUND OF THE INVENTION

1. Field of the invention

The present invention relates to remote electrical monitoring and, more particularly, to an economical means for remotely monitoring (and for providing a variety of fault alarms) of illuminated signage, security lighting, ATM illumination, ATM security lighting, parking lot lighting, and general area lighting.

2. Description of the Background

There is a vast array of commercial illuminated signage, security lighting, parking lot lighting, and general lighting which casts an important reflection of the owner establishments. In most any city it is possible to drive down a main thoroughfare and observe partially malfunctioning illuminated signs that send an incomprehensible message, or worse, an unintended and disparaging message. Moreover, there is a liability issue attached to commercial security lighting. Both landlord and tenant are potentially liable for the safety of patrons in and around their buildings and their parking lots, and their liability exposure increases drastically when the lights are completely out or dimly lit. Thieves and muggers view dimly lit parking lots as an open opportunity. The latter situation is especially apparent around banks and ATM machines, which are frequented by patrons at night. Consequently, there is a great commercial demand for ways of monitoring commercial signage and lighting to reduce liability exposure and maintain lighting and illuminated sign aesthetics.

It is well known how to detect fault conditions in signage and lighting. For example, U.S. Pat. No. 5,680,286 to Pacholok shows a load fault detector for high frequency luminous tube power supplies. The device detects certain load fault conditions of neon signs connected to high voltage, high frequency power supplies including open circuit, broken tube and other balanced load fault conditions. However, the remedy for a malfunction is simply to shut the lights off, and an automatic power supply shut-down switch is suggested. This does nothing to notify the proprietor or reduce downtime.

There are a few intelligent systems that do provide notification as well as monitoring. For example, U.S. Pat. No. 6,441,565 to Levy shows an intelligent outdoor lighting control system which automatically senses, records and transmits data relevant to the operation of the lighting system so that both control and maintenance can be performed more efficiently. Again, a current sensor monitors current to the lamps at each lamp location, and a bi-directional data link is used to transmit data from each sensor to a command station, and vice versa.

U.S. Pat. No. 5,774,052 to Hamm et al. shows a monitoring and alerting system for buildings, and particularly for unoccupied commercial businesses and ATMS. The system includes one or more light level sensors directed to observe the light levels and a schedule. If the light level at the selected area does not reach or maintain the desired light level, corrective action is taken. If the commercial establishment is a bank and the light level is at an ATM (automatic teller machine) the system may temporarily shut the ATM machine down and illuminate a sign to indicate that the ATM is not open. The system also senses other discrepancies such as failure of heating, water leaks, etc. however, the system as well employs a modem and telephone communications link to a human monitoring station for alerting and corrective action.

Unfortunately, both of the foregoing systems are cumbersome and expensive, and they rely on placing the current sensors at the equipment locations rather than monitoring at the power source. (electrical panel).

It would be greatly advantageous to provide a more economical illuminated signage, security lighting, parking lot lighting and general lighting monitoring system that monitors commercial lighting for current load faults, and which will automatically send multiple alarms defining the site location and nature of the problem for each monitored circuit, In addition a predefined numeric indication can be sent to a pager(s) to flag signs/lights in need of repair, thereby providing a cost effective way of maintaining aesthetics as well as safety if an area becomes dimly lit or complete lighting outage occurs.

SUMMARY OF THE INVENTION

It is, therefore, an object of the present invention to provide an economical means of monitoring and alarming of illuminated signage, security lighting, ATM illumination, ATM security lighting, parking lot lighting, and general area lighting.

It is another object to provide a sign sentry which monitors multiple lighting circuits and which sends a fault message if any one circuit either drops below it's preset field adjustable current draw, fails to operate, or is operating during an unscheduled time period (during the daytime).

It is another object to provide a sign sentry that will automatically send an error code comprising the site location, circuit affected, and nature of the fault.

It is yet another object to provide a sign sentry that will automatically send a digital error code to a central monitoring station which, in turn will transmit a variety of fault indication messages, thereby providing the flexibility to ensure immediate notification to store owner(s), facility/maintenance department, sign company and/or security personal. They are better able to maintain general lighting/sign aesthetics, and can avoid compromising the safety of their patrons and employees if an area becomes dimly lit or complete lighting outage occurs.

According to the present invention, the above described and other objects are accomplished by providing an economical means for remotely monitoring illuminated signage, security lighting, ATM illumination, ATM security lighting, parking lot lighting, and general area lighting. The sign sentry is capable of monitoring multiple lighting circuits, and any lighting circuit which either drops below its preset current draw, fails to operate, or is operating during an un-scheduled time period will automatically trigger the sending of a digital error code to a central monitoring station. The error code defines the site location, circuit affected, and nature of the fault. This allows the monitoring station to telephone responsible persons and define the site location and nature of the problem for each monitored circuit. In addition, a predefined numeric indication can be set to pager(s), or an email message can be sent, thereby allowing the store owner(s), facility/maintenance department, sign company and/or security personnel to maintain general lighting and sign aesthetics, as well as to prevent safety issues if an area becomes dimly lit or a complete lighting outage occurs.

The monitoring system generally includes a monitoring panel mounted proximate the interior junction box for monitoring the exterior signage (which derives its power through the interior junction box), and a plurality of sensors in communication with the monitoring panel. The monitoring panel encloses a printed circuit board containing a processor in communication with memory, an analog-to-digital transducer, and a modem (that is also connected to a telephone line). A plurality of current sensors are deployed in the junction box, each being inductively coupled to an existing lighting circuit of the exterior signage for sensing a current level therein. The leads of the current sensors are connected from the junction box into the monitoring panel, and are coupled therein to analog-to-digital transducers on the PCB for converting the sensed current levels to digitized current levels.

A software program is resident in the memory for polling each analog-to-digital transducer to measure the digitized current levels at the current sensors. In addition, the processor maintains a clock to determine whether said measurement are during a predetermined daytime interval or nighttime interval. During the daytime interval, the digitized current levels are compared by the processor to predetermined minimal current thresholds which have been established for each lighting circuit to ensure that none of the lighting circuits are on during daytime. On the other hand, if the measurements are made during the nightime interval, the digitized current levels are compared by the processor to both an upper current threshold and lower current threshold (preset for each lighting circuit) to ensure that all lighting circuits are on and drawing normal current during the nighttime interval. If a fault condition is detected (if any of said comparisons fail) the processor generates and stores an error code in memory, the fault code comprising an indication of the site, affected lighting circuit, and nature of the fault, and activates the modem to dial a central monitoring station and transmit said error code thereto. The central monitoring station can use telephone, voice mail, pagers, email and/or voice email for reporting the fault details to the appropriate daytime or nighttime persons responsible for the site.

The sign sentry system offers an affordable alternative to commercial signage monitoring due to its simplicity, fault diagnostic capabilities, and the ability to send detailed fault codes to a full service monitoring station defining the site location, particular circuit, and nature of the problem for each monitored circuit. This ensures that commercial property owners can act immediately to maintain the aesthetics of their establishment as well as avoid liability for compromised safety in dimly lit areas.

BRIEF DESCRIPTION OF THE DRAWINGS

Other objects, features and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
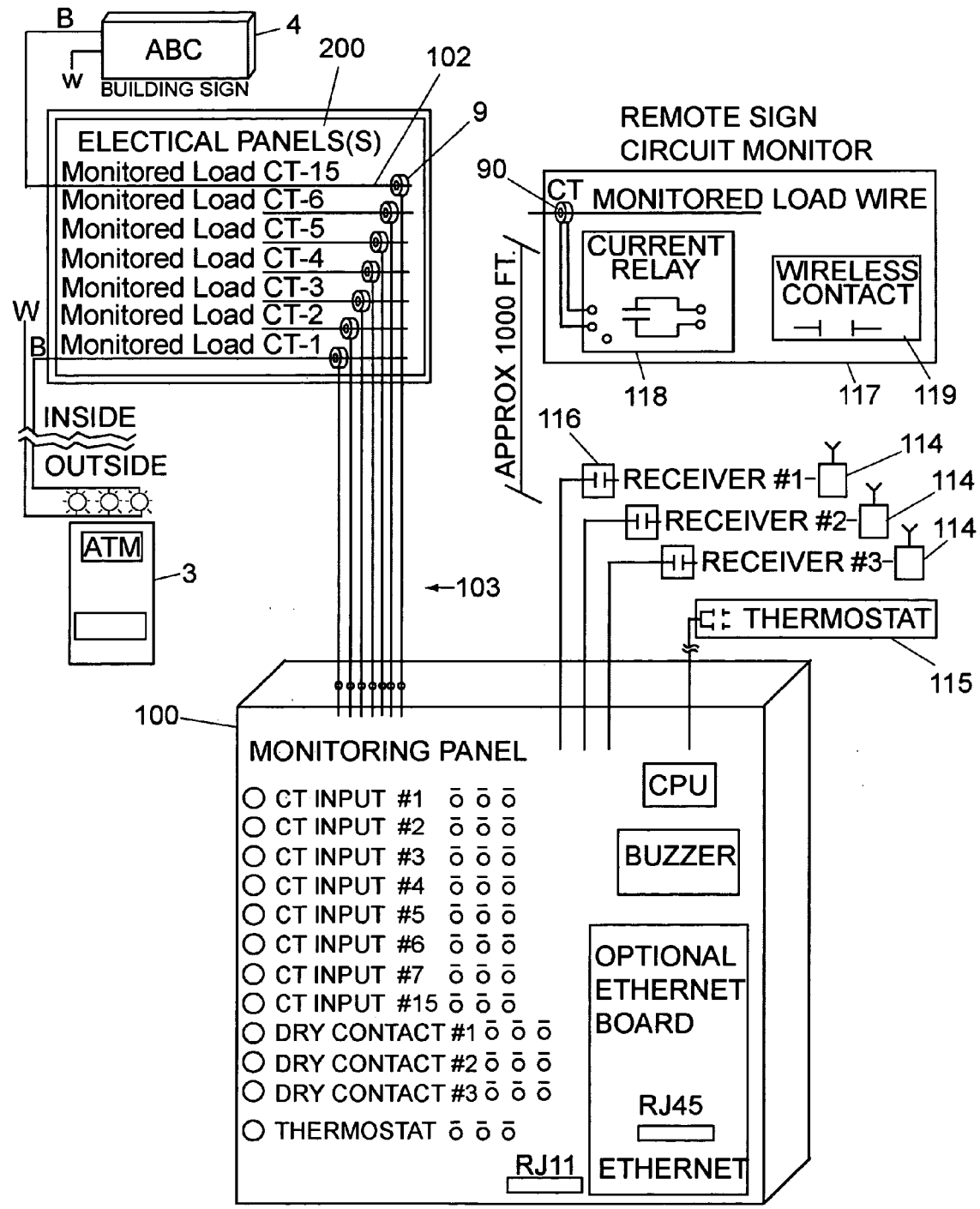
FIG. 1 is a perspective diagram of the sign sentry system according to the present invention.

FIG. 1 is a perspective diagram of the sign sentry system according to the present invention. The sign sentry system generally includes a monitoring panel 100 mounted proximate the electrical panel 200 of a lighting system 1. The sign sentry system monitoring system 100 includes three types of sensors for providing feedback to the monitoring panel 100: 1) hardwired Current amplification Sensors 9 which are connected to the monitoring panel 100; 2) Remote Sensing Unit 117 which communicate with a receiver unit mounted proximate the monitoring panel 100 via spread spectrum RF; and 3) a thermostat 115 for monitoring building or ATM/Isotel room. All three types of sensors are available for effective monitoring of simple to complex signage and ATM machine protection.

For illustration purposes, a simple exterior lighting system 1 is shown in FIG. 1 wherein a single exterior lighting circuit for an ATM machine 3, as well as a building sign 4 lighting circuit, are both wired to a common electrical panel 200 (typically being located inside the establishment). The lighting system 1 shown at left is a very simple automated teller machine (ATM) sign which involves a single lighting circuit connected by hot (B) and neutral (W) wires running directly to the electrical panel 200. Typically, an establishment will have a variety of lights subdivided into separate lighting circuits, each lighting circuit being powered by current from electrical panel 200 resident in the building. More complex lighting systems may include many more lighting circuits. The illustrated sign sentry system 100 is equipped to handle up to fifteen hard-wired Current Amplification Sensors 9 and the architecture is scalable to monitor additional lighting circuits at any one location, depending on need.

The monitoring panel 100 is mounted near the electrical panel 200, and the Current Amplification Sensors 9 are connected to monitoring panel 100. One Current Amplification Sensor 9 is dedicated to each of fifteen lighting circuit inputs to the electrical panel 200, the inductive pickup of each Current Amplification Sensor 9 being mounted around the hot lead of the circuit inside electrical panel 200, inclusive of those of the ATM lighting system 1 and the building sign 4 lighting circuit. The hardwired Current Amplification Sensors 9 are in turn wired directly into monitoring panel 100 of the sign sentry system.

In addition to the hardwired Current Amplification Sensors 9, a plurality of Remote Sensing Units 117 are available to monitor more distant signs, such as Shopping Center Parking Lot pylons, which typically have their own junction boxes and thus are not wired through the same electrical panel 200. The sign sentry system may be equipped to handle a plurality of Remote Sensing Units 117 for a number of remote signs, depending on design choice. Each Remote Sensing Unit 117 is equipped with a Current Amplification Sensor 90 likewise mounted around the hot lead in the remote sign junction box. The Current Amplification Sensor 90 is coupled to a current sensing relay 118, also resident in the Remote Sensing Unit 117, relay 118 having an on-board adjustable percentage-of-decrease trip point which throws a wireless contact 119. The wireless contact 119 is a 900 Mhz transmitter that communicates via spread spectrum RF to a 900 Mhz receiver 114 located at the monitoring panel 100 of the sign sentry system. The wireless contacts 119 may be conventional T900FM (transmitter) 900 MHz data transmit modules from Applied Wireless, Camarillo, Calif., with ranges are up to 1000 ft. The matching R900FM receivers 114 are connected directly to dry contact inputs 116 of monitoring panel 100. The illustrated embodiment is equipped with three receivers 114 connected to three dry contacts 116 to accommodate up to three remote Current Sensors Relays 117, although again this is scalable and additional dry contacts may easily be provided. Each remote Current Sensor 117 has approximately a 1000 foot range for monitoring remote signage.

Finally, a thermostat 115 is available to monitor the space ambient temperature with the Building or ATM/Isotel room heating and cooling system malfunctions. This is very important for ATM machine operation.

Installation involves mounting the monitoring panel 100 of the sign sentry system proximate the electrical box 200, and connecting each inductive pickup of the Current Amplification Sensors 9 around the hot lead of a corresponding circuit inside electrical panel 200. The lead wires of the Current Amplification Sensors 9 are then connected to the monitoring panel 100 as will be described, and the Current Amplification Sensors 9 are thereby able to monitor the current flowing in each lighting-system circuit. The sign sentry system 100 includes control logic that collectively monitors all of the lighting circuits at a given location under the premise that illuminated signage, accent/landscape lighting, parking lot lighting, security lighting, etc., are "ON" at night and is usually "OFF" during the day, but the system is fully configurable to monitor 24 hour lighting circuits. The system checks for the following faults: undercurrent or no current conditions during a designated night period, and current during a designated day period. This is accomplished instantly and economically with microprocessor-based control running software (to be described). Upon sensing a fault the sign sentry system 100 the processor/software generates an error code which identifies the specific building, lighting circuit and fault condition. The sign sentry system automatically dials out and transmits a digital error code to a central monitoring station which, in turn can transmit a variety of user-determined messages, inclusive of real-time telephone calls, voice mail messages, numeric pages, and/or email messages to any desired designee (such as a facility manager, store owner(s), facility/maintenance department, sign company and/or security personal). This provides immediate notification of signs/lights in need of repair, thereby offering a cost-effective way of maintaining aesthetics as well as safety in dimly lit areas. The responsible persons are better able to maintain general lighting/sign aesthetics, and can avoid compromising the safety of their patrons and employees if an area becomes dimly lit or complete lighting outage occurs. Also sign sentry will re-alarm every 24 hours until repairs are properly made.

Figure 2:
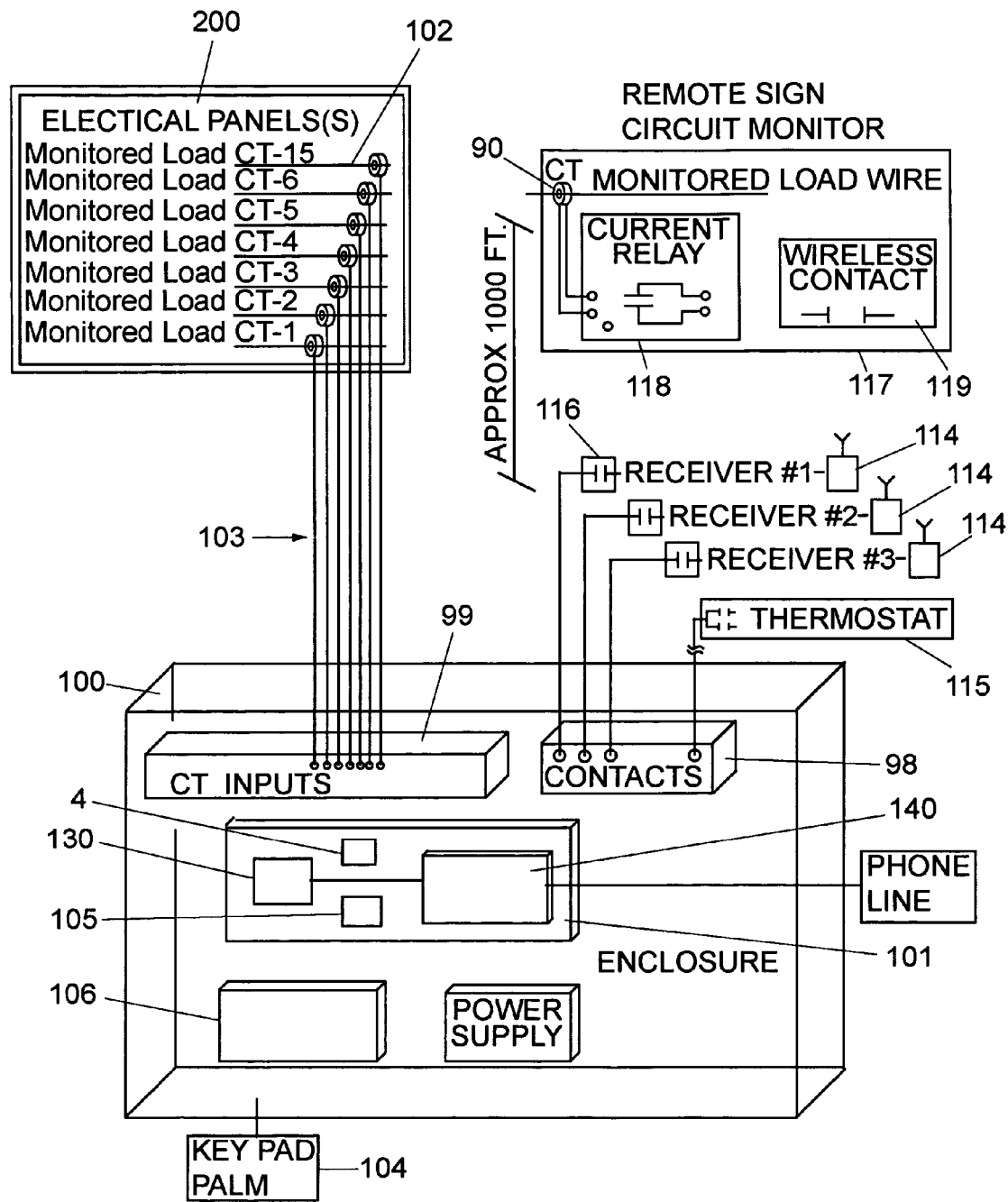
FIG. 2 is a perspective system diagram of the sign sentry system as in FIG. 1 showing the internal configuration of the monitoring panel 100.

FIG. 2 is a perspective system diagram of the sign sentry system as in FIG. 1 showing the internal configuration of the monitoring panel 100. Monitoring panel 100 includes a rectangular wall enclosure with hinged front. The system is powered from a 24 vdc Power Supply PS coupled to a system printed circuit board PCB 101. The PCB 101 generally includes a transducer bank 4, processor 130, modem 140 (preferably with plural jacks connected to alternate phone lines), and network interface (not shown). In addition, a keypad data entry port 105 is connected to the PCB 101 to allow on-site configuration of the software using a keypad data entry 104 device such as an Intelligent Instrumentation TM2500 Keyboard Data Entry Microterminal (or like device). Processor 130 is factory programmed with a particular operating sequence to be described, and programming is preferable accomplished using a conventional software development system with integrated assembly language compiler, loader and debugger. Specific current thresholds and time intervals are preferably programmed in the field using a laptop connected to the network interface, or the dedicated keypad interface device 104 attached to the interface jack [[106]] 105 of PCB 101. The transducers [[120]] 4 are conventional analog-to-digital (A/D) transducers for converting the incoming 0–0.333 millivolts signals into a digital logic signal capable of being read by processor 130. The processor 130 is equipped with a standard set of on-board support circuitry, depending on processor type, which generally includes memory (RAM, FLASH, ROM, Prom), memory management, memory caches, a clock and timer. Processor 130 may be any conventional, preferably inexpensive RISC or CISC processor with its associated support circuitry.

Current Amplification Sensors 9

The Current Amplification Sensors 9 are inductive transformer coils with an input range of 0 to 30 amperes, and output of 0 to 0.333 millivolts in proportion to the input range. The Current Amplification Sensor 9 coils act as an induction pickup to provide an amplified voltage level corresponding to the amount of current in the line that it encircles. Each monitored lighting circuit in the electrical panel 200 is tapped as described above with a corresponding Current Amplification Sensor 9. The leads 103 of the Current Amplification Sensors 9 are extended down through the sign sentry monitoring panel 100 to a mounting connector 99 (male/female plug-type or other mounting block), and are thereby connected to a corresponding transducer in transducer bank 4, which in turn communicates with processor 130.

By use of a data entry device attached to the keypad data entry port 105 a full-current draw baseline can be established for the Current Amplification Sensors 9, as well as a trip-point which may be an adjustable 15% to 50% decrease of current from the 100% baseline current.

Remote Sensors 117

The Remote Sensing Units 117 need not be connected to transducers 4 as these are equipped with their own resident current sensing relays 118. Each Remote Sensing Unit 117 includes it's own unique current amplification sensor (CAS) 90, the leads of the CAS 90 being connected to an on/off current sensing relay 118 which closes or opens an internal set of control contacts when the applied current exceeds or falls below a user-preset current sensing threshold. Suitable user-adjustable current relays 118 are commercially available from, for instance Functional Devices, Inc. The Functional devices RIB line of current relays include two LEDs which indicate status (closed or open), and which assist with installation. The setpoint of each such current relay 118 is field-adjustable by turning a 20-turn potentiometer mounted within the current relay enclosure. The on/off current sensing relay 118 are connected to a transmitter also within Remote Sensing Unit 117, which broadcast the open and closed contact position of current sensing relay 118 to a wireless receiver 114 at the monitoring panel 100. The receivers 114 are connected to dry contacts 116 which open and close in response to current relays 118. The dry contacts 116 are plugged into one of the three available channels at plug 98 of monitoring panel PCB 101. Connector 98 is wired to the printed circuit board PCB 101 for communication with processor 130. By manual adjustment of the current relay 118 in Remote Sensors 117, a full-current draw baseline can be established for the Current Amplification Sensors 90, as well as a trip-point which may be an adjustable 15% to 50% decrease of current from the 100% baseline current. Thus, given the adjustable 15–50% current flow drop at the Current Amplification Sensor 90, the current relay 118 contacts for this circuit will open, sending a 900 MHz fault signal via wireless contact 119 to receiver unit 116 located proximate sign sentry monitoring panel 100. For example, assume that a monitored electrical circuit is powering ten outside security lights around a building perimeter, and each of the lights draws 0.5 amps. All lights are verified to be on and the current relay 118 potentiometer is adjusted to establish the current draw baseline for all ten lights. In this case, 5.0 circuit amperes become the base line for 100% lighting operation, and this is set by adjusting the current relay 118 by its associated potentiometer until an LED on relay 118 illuminates. If the current relay 118 is set to a baseline current of 5 amps with a 15% drop allowance, should any two of the ten lights burn out it will cause a 20% loss of the base line circuit current draw, thereby causing the current sensing relay 118 control contacts 119 to open. This will send a wireless fault signal to receiver 114.

Thermostat 115

Thermostat input 115 may be any conventional dual-setpoint thermostat for monitoring the ambient temperature at the monitoring panel 100 to detect building heating and cooling system. For example, a Honeywell T8400C standard electronic thermostat in which both hot and cold setpoints are permanently held in memory is acceptable.

Software

The program operation of Processor 130 for each type of input (Current Amplification Sensors 9, Remote Sensing Units 117, and Thermostat 115) will now be described.

Figure 3:
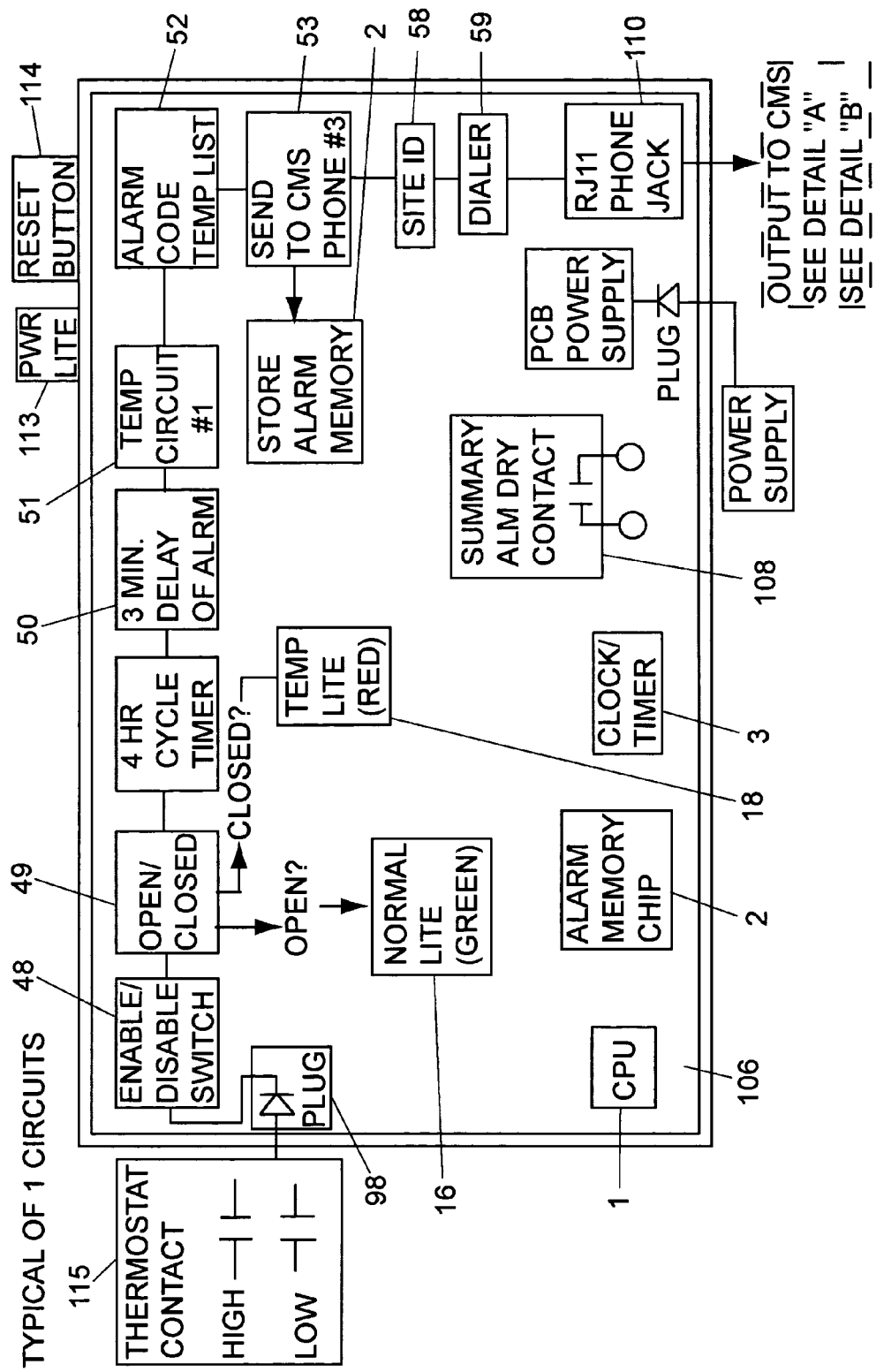
FIG. 3 is a flow diagram of the software program steps taken by processor 130 in monitoring the thermostat 115.

FIG. 3 is a flow diagram of the software program steps taken by processor 130 in monitoring the thermostat 115, which additionally lays out supporting circuitry detail on PCB 101. The thermostat 115 is plugged into Monitor Panel PCB plug 98 on PCB 101. A software Enable/Disable Switch 48 is set by Keyboard Interface 104 to Enable or Disable the thermostat monitoring function, and an LED 18 & 16 are provided on PCB 101 to indicate the operational status (alarm or normal) of the thermostat 115. If one of the thermostat 115 contacts shorts, indicating either a high or low temperature fault (example: 80° high & 40° low) condition (defined by temperature presets at thermostat 115), and if the Enable/Disable switch 48 is enabled, processor 130 repeatedly polls the thermostat contacts and will note the closed contact fault at step 49. The software will initiate a three-minute delay at step 50 to confirm a steady fault condition exists to prevent a false alarm. After the time delay the processor 130 will then formulate an alarm code comprising the faulty circuit number at step 51 which is factory fixed at "Circuit #19" for the thermostat input and a fault alarm code at step 52, which is also factory fixed at "101" for the thermostat input. Processor 130 also maintains a four hour cycle and will cause a Re-Alarm every 4 hours if the thermostat contacts remain closed. At step 53 the alarm code is stored in the memory, and at step 59 the processor 130 initiates an auto dialing procedure through dialer/modem 140 using preprogrammed phone numbers and reports the digital fault code of time & date from clock 3, circuit number from 51, alarm code from 52, and site ID from 58 to the central monitoring station.

For the hard-wired and remote current sensors 9, 90, a user may enable nighttime monitoring by which the processor 130 monitors at night to ensure that user-selected lights are properly on, and/or may enable daytime monitoring to ensure that user-selected lights are not improperly illuminated.

Figure 4:
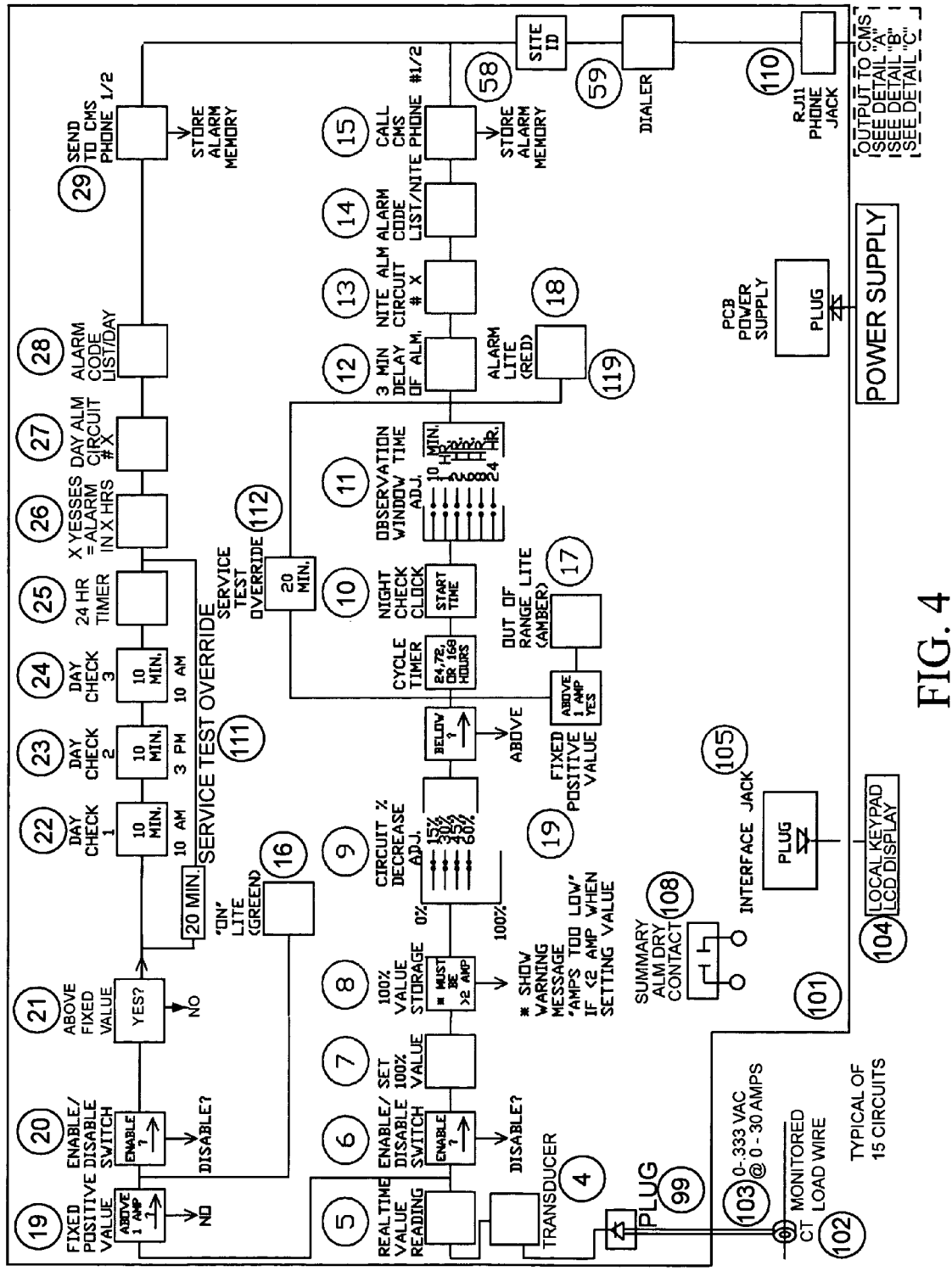
FIG. 4 is a flow diagram of the program steps taken by processor 130 in monitoring the Analog Current Amplification Sensors 9.

FIG. 4 is a flow diagram of the program steps taken by processor 130 in monitoring the Analog Current Amplification Sensors 9, which additionally lays out supporting circuitry detail on PCB 101. At installation, each monitored lighting circuit is initially verified by the installer of this device to be operating at 100% capacity.

The Current Amplification Sensors 9 are each plugged into an available channel at plug 99 on monitoring panel PCB101, which in turn connects them to a corresponding transducer 4. The transducers 4 are used for converting the incoming 0 to 0.333 millivolt signals into a digital logic signal capable of being read by processor 130 at Real time value reading 5. The processor 130 tracks a separate daytime monitoring cycle and nighttime monitoring cycle as described below.

Nighttime Monitoring

The nighttime monitoring function (lower branch of flow chart of FIG. 4) is used to check lights & signage which should be on at night.

An Enable/Disable switch 6 is provided at each of the fifteen (one exemplary channel shown on FIG. 4) Analog Current Amplification Sensor 9 channels to allow installer to turn polling by Processor 130 of each channel ON or OFF (this is necessary to allow the current fault thresholds to be set and monitoring by processor 130). With Enable/Disable switch 6 Enabled, at step 7 the installer uses a setpoint button at keypad interface 104 which allows the processor 130 to recognize and retain the normal 100% current draw for that lighting circuit, and this value is stored as a baseline within the appropriate circuit number of the 100% storage value memory chip 8. The installer can then adjust by keypad interface 104 the desired percent of light circuit outage from the four predefined incremental adjustments selected as shown in step 9. For example, if a three 100 watt bulb lighting circuit is being monitored, and a 30% current decrease is programmed at step 9 by the installer, one blown bulb will be reported. Alternatively, if a single bulb is not considered to be a failure, a 60% current decrease may be programmed at step 9 by installer such that two blown bulbs are required to trigger a circuit failure. More specifically, if processor 130 determines the presence of current draw at Analog Current Amplification Sensor 9 based on the real-time value reading from step 5, the Enable/Disable switch 6 is enabled, and the monitored circuit is below the 100% storage value at step 8 by the percentage of decrease at step 9, processor 130 will delay for a user-programmed observation time. At step 10 a night check clock is set by the installer using keypad interface 104 to determine the start time of the monitoring/observation cycle for that circuit. For example, circuit #3 is set to start monitoring at 9 pm. At step 11 the observation window length is also set by installer at keypad interface 104 from the predetermined observation window times shown at step 11, and this determines the length of time that the night monitoring cycle will last. For example, if at step 11 the observation window length is set at 2 hours the observation of circuit #3 will start at 9 pm (per step 10) and will end 2 hrs later at 11 pm each night (per step 11).

During [this during] the nighttime observation cycle, should one of the enabled fifteen Current Amplifications Sensors 9 detect a current fault condition, the processor 130 will initiate a fixed three-minute delay at step 12 to prevent a false alarm. Once time delay 12 is expired, at step 15 the processor 130 will store alarm at position A, alarm memory chip in FIG. 7 and initiate an auto dialing procedure through dialer/modem 140 using stored phone numbers in a phone list 59, and will report the digital fault code of time & date from clock 3, circuit number from 13, alarm code from 14, and site ID from 58 to the central monitoring station.

Day Time Monitoring

The day time monitoring function (upper branch of flow chart of FIG. 4) is used to check lights & signage which should be off during the day. At step 19 processor 130 determines the presence of current draw at Analog Current Amplification Sensor 9 based on the real-time value reading from step 5. If the reading is above I amp of current the circuit is determined by Sign Sentry monitoring panel 100 to be ON and green lite 16 will illuminate. An Enable/Disable switch 20 is provided at each of the fifteen analog monitoring circuits to allow installer to turn polling of that circuit by processor 130 ON or OFF. With Enable/Disable switch 20 set to Enable and the current reading at 5 for that circuit is above 1 amp it will sit and wait for a factory programmed observation window. For example, at 10 AM and 3 PM every day the circuit will be polled by processor 130 to determine if circuit is above 1 amp, and if so it will be logged into memory chip at position G in FIG. 7. If three consecutive readings are positive with within a 24 hour cycle then at step 26 the processor 130 will store alarm into alarm memory chip at position A FIG. 7 and initiate its auto dialing procedure through dialer/modem 140 using the stored phone #'s 1 & 2 from a phone list 59, and will transmit the digital fault code including time & date from timer/clock 3, circuit number from 27, alarm code from 28, and site ID from 58 to the central monitoring station.

In order to monitor more distant signs, such as Shopping Center Parking Lot pylons, which typically have their own junction boxes and thus are not wired through the same electrical panel 200, the sign sentry system may be equipped to handle a plurality (three are shown in FIG. 1) of Remote Sensing Units 117. The Remote Sensing Units 117 need not be connected to transducers 4 as these are equipped with their own resident current sensing relays 118.

Figure 5:
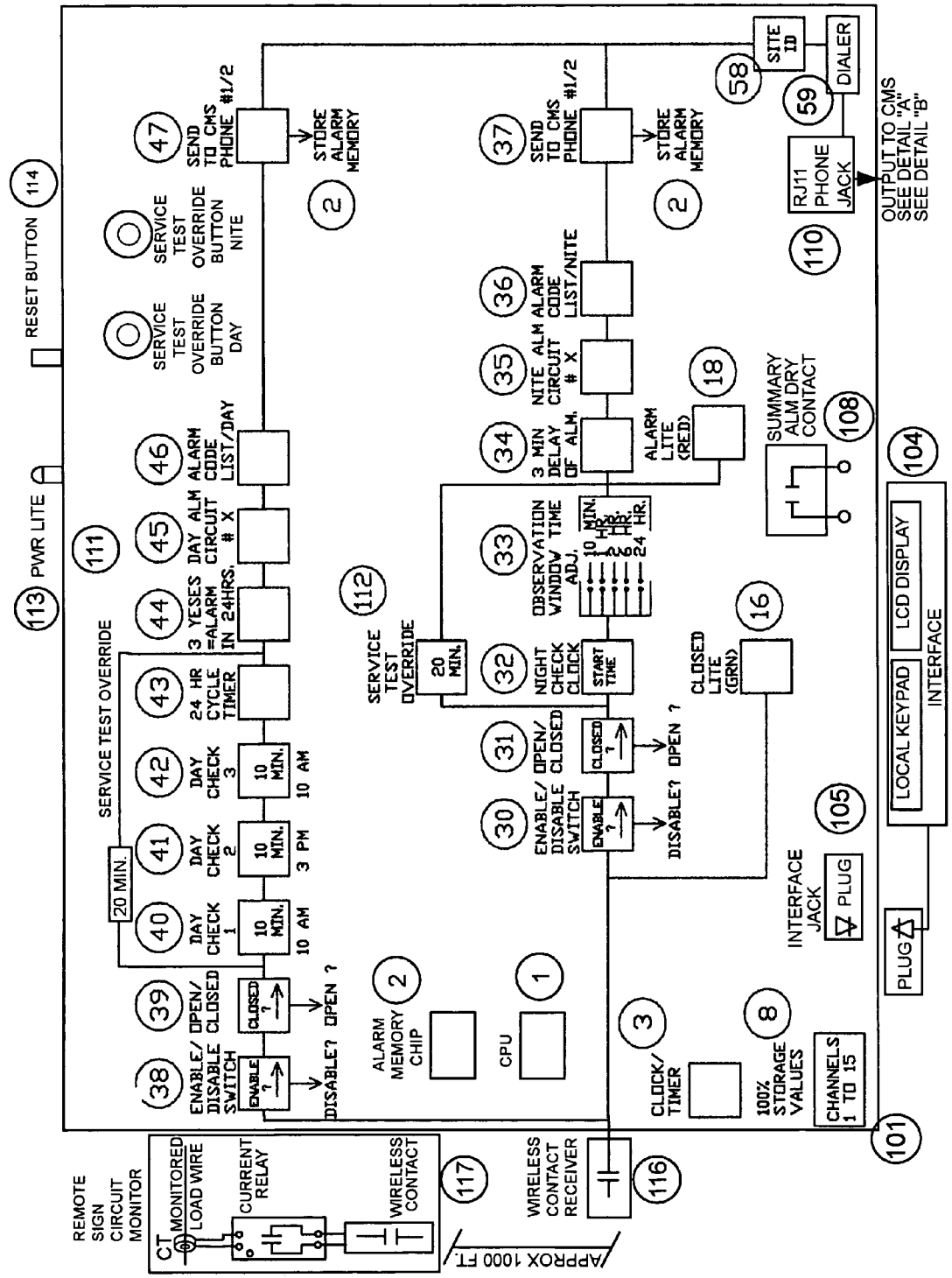
FIG. 5 is a flow diagram of the program steps taken by processor 130 in monitoring the Remote Sensing Units 117.

FIG. 5 is a flow diagram of the program steps taken by processor 130 in monitoring the Remote Sensing Units 117, which additionally lays out supporting circuitry detail on PCB 101.

Nighttime Monitoring (Lower Branch of FIG. 5)

A software Enable/Disable switch 30 is provided for each of the three Remote Sensing Units 117 to allow an installer to Enable/Disable by use of keypad 104, thereby enabling or disabling night time polling and monitoring of that remote circuit by Processor 130. Once Enabled the processor 130 repeatedly polls the closed or open contacts 118 of that Remote Sensing Unit 117. A closed contact 118 represents acceptable current draw (lighted condition) wherein CAS 90 is at an acceptable level, while an open contact 118 represents a fault and repair is required. If Remote Sensing Unit 117 at step 31 is open it will sit and wait for the user programmed observation time. At step 32 a night check clock is set by the installer using keypad interface 104 to determine the start time of the monitoring/observation cycle for that circuit. Say the processor 130 is set to start monitoring at 9 pm. At step 33 the observation window length is also set by installer at keypad interface 104 from the predetermined observation window times (step 33) as this determines the length of time that the night monitoring cycle will last for. For example, if set at 2 hours the night observation of the lighting circuit will start at 9 pm (as set at step 32) and will end 2 hrs later at 11 pm each night (per the 2 hours set at step 33).

Should one of the enabled three Remote Current Amplifications Sensors 117 detect or already be in a current fault condition at the start or during the nighttime observation cycle, the processor 130 will initiate a fixed three-minute delay, at step 34 to prevent a false alarm. Once time delay 34 is expired, flow continues to step 37 wherein the processor 130 will store the alarm in memory at position A in FIG. 7 and initiate an auto dialing procedure through. dialer/modem 140 using stored phone numbers in a stored phone list 59. The processor 130 will report the digital fault code including time & date from the timer/clock 3, factory assigned circuit number from 35, user programmed alarm code from 36, and factory assigned site ID from 58 to the central monitoring station. The processor 130 will re-alarm every 24 hours until circuit is repaired.

Day Time Monitoring

Daytime monitoring (upper branch of FIG. 5) is used to check lights & signage which should be off during the day. As above, a software Enable/Disable switch 38 is provided for each of the three Remote Sensor 117 channels to allow installer to Enable/Disable polling of that channel by use of keypad interface 104. Once Enabled the processor 130 repeatedly polls the closed or open contact status of that remotely-monitored circuit. A closed contact 118 sent from transmitter 119 to receiver 114 represents current draw (lighting condition) at CAS 90 to be ON, while an open contact 118 represents a fault and repair is required. With the Enable/Disable switch set to Enable at step 38 and the contacts 118 closed, processor 130 will sit and wait for the factory programmed observation times, for example, at 10 AM for 10 minutes and then again at 3 PM for 10 minutes. The processor 130 will poll the Remote Sensor 117 every day to determine if lighting circuit is ON, and if so it will be logged into memory at step 46 at each time check. If three consecutive day readings are positive with within a 24 hour cycle, at step 44 the processor 130 will store the alarm in memory chip at position A in FIG. 7 and at step 47 and will initiate an auto dialing procedure through dialer/modem 140 using the stored phone numbers from its stored phone list 59, and the digital fault code will be reported to the central monitoring station, inclusive of time & date from clock/timer 3, lighting circuit number from Step 45, alarm code from step 46, and site ID from step 58. The processor 130 will re-alarm every 24 hours until circuit is repaired.

Two service test override buttons 111 and 112 are provided for use by the installer and or service personnel to test Sign sentry monitoring panel 100 for a 20 minute cycle, each effectively forcing the processor 130 into the respective daytime or nighttime cycles each time they are pressed without having to wait for the programmed observation time.

Figure 6:
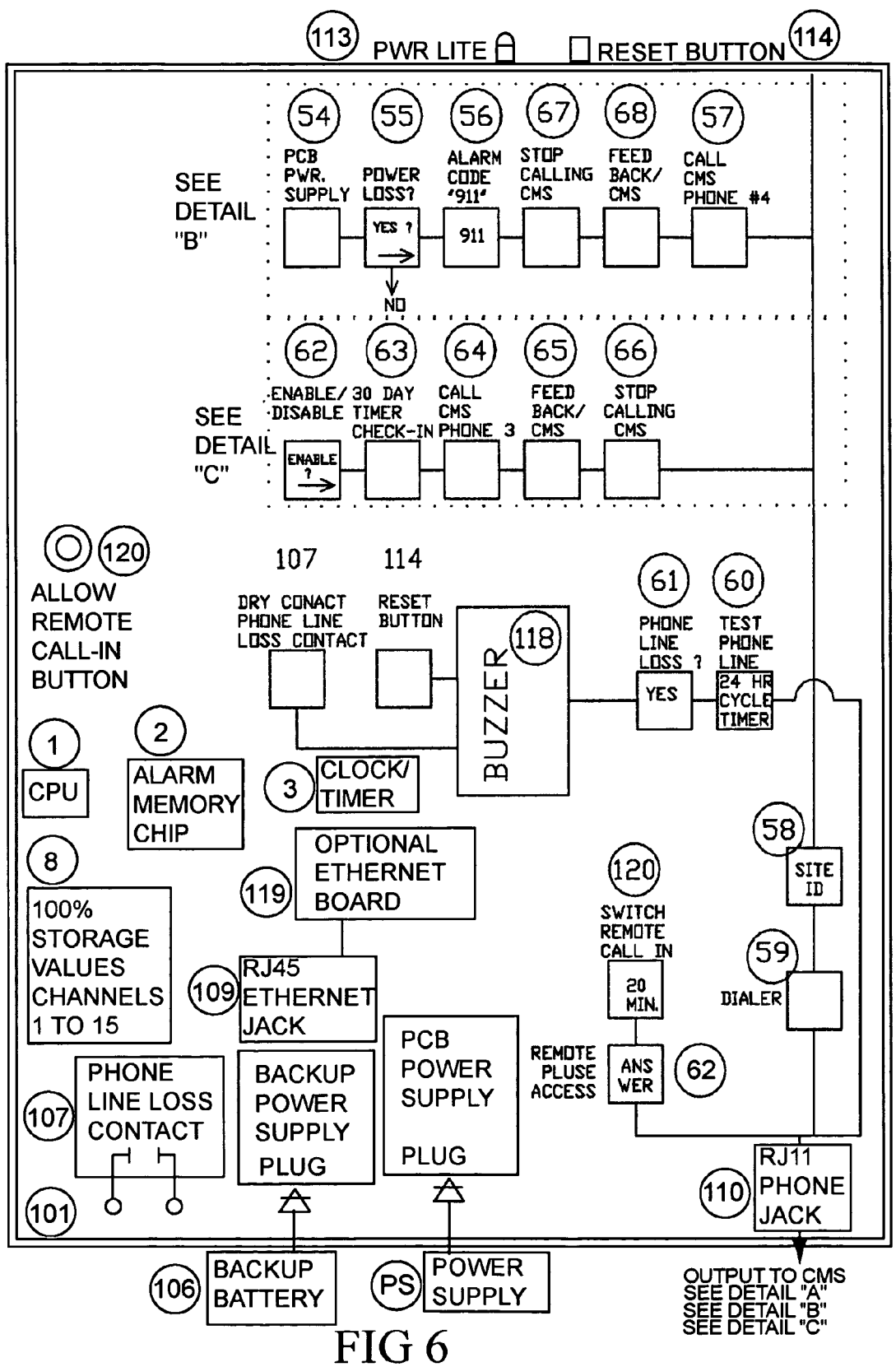
FIG. 6 is a flow diagram of the program steps taken by processor 130 in self-diagnostics by which it monitors for power failures, phone line failures, and provides remote access for remote diagnostics.

FIG. 6 is a flow diagram of the program steps taken by processor 130 in self-diagnostics by which it monitors for power failures, phone line failures, and provides remote access for remote diagnostics.

A power loss to the Sign Sentry monitoring panel 100 shall be detected by processor 130 at step 54 which monitors incoming power at the PCB power supply PS plug. If power is lost, the backup battery 106 continues to power all essential components to allow Sign Sentry monitoring panel 100 to report power outage to central monitoring station. Once incoming power is lost at PCB power supply PS a flag is sent to processor 130 at step 57, and a 5 minute time delay is initiated to prevent a false alarm. For example, once a 5 minute time delay has expired processor 130 sends a command to dialer/modem 140 to call the central monitoring station 300 on an alternate phone number and reports to the factory configured fault code of 911, and the factory configured site address 58, into the central monitoring station 300. This particular alarm requires feed back from the central monitoring station that it was received, and once feed back is received at step 68 a command is sent to processor 130 to stop calling the central monitoring station 300 at step 67. If for some reason feedback is not received at Step 68 the processor 130 shall repeatedly dial out on the alternate phone number every 10 minutes until it receives feedback from the central monitoring station 300, or until backup battery 106 expires.

The monitoring panel 100 is also equipped with 30 Day Check-In feature provided as an option for subscribers. Where a subscriber considers monitoring to be critical, they can additionally subscribe to the 30 Day Check-In feature. An Enable/Disable switch 62 for this feature can be set by an installer using keyboard interface 104. Once Enabled, the processor 130 shall command a 30 day check in at step 63 and shall cause dialer/modem to call the central monitoring station 300 at step 64. Once again feedback from central monitoring station is required and if received at step 65 processor 130 will stop calling at step 66. If feedback is not received at step 65 processor 130 shall cause dialer/modem 140 to repeatedly dial out every 10 minutes until it receives feed back from the central monitoring station 300, or until the backup battery 106 expires.

The monitoring panel 100 is also equipped with a phone-line loss diagnostic. Processor 130 polls modem 140 to detect a dial tone at step 61 every 24 hours at a preset time (say 12 AM) and if it does not get a dial tone processor 130 activates a buzzer 118 mounted on PCB101. Buzzer 118 shall continuously sound until a reset button 114 on the exterior of Sign Sentry monitoring panel 100 is depressed. A dry contact switch 107 is also closed to send a warning signal for customer base monitoring at their own building security panel or energy management system. Once the reset button 114 is pushed by customer, buzzer 118 will remain off if the phone line is restored, however if after 24 hours there is still no dial tone the buzzer 118 will re-alarm and the dry contact switch 107 shall close again.

In all the above-described fault conditions, the fault messages can be selectively relayed from the central monitoring station to voice mail, a manager's cell phone number, a paging service, or even an internet-based voice mail service. Any one or combination of these corrective measures can be taken for each detected fault condition.

Figure 7:
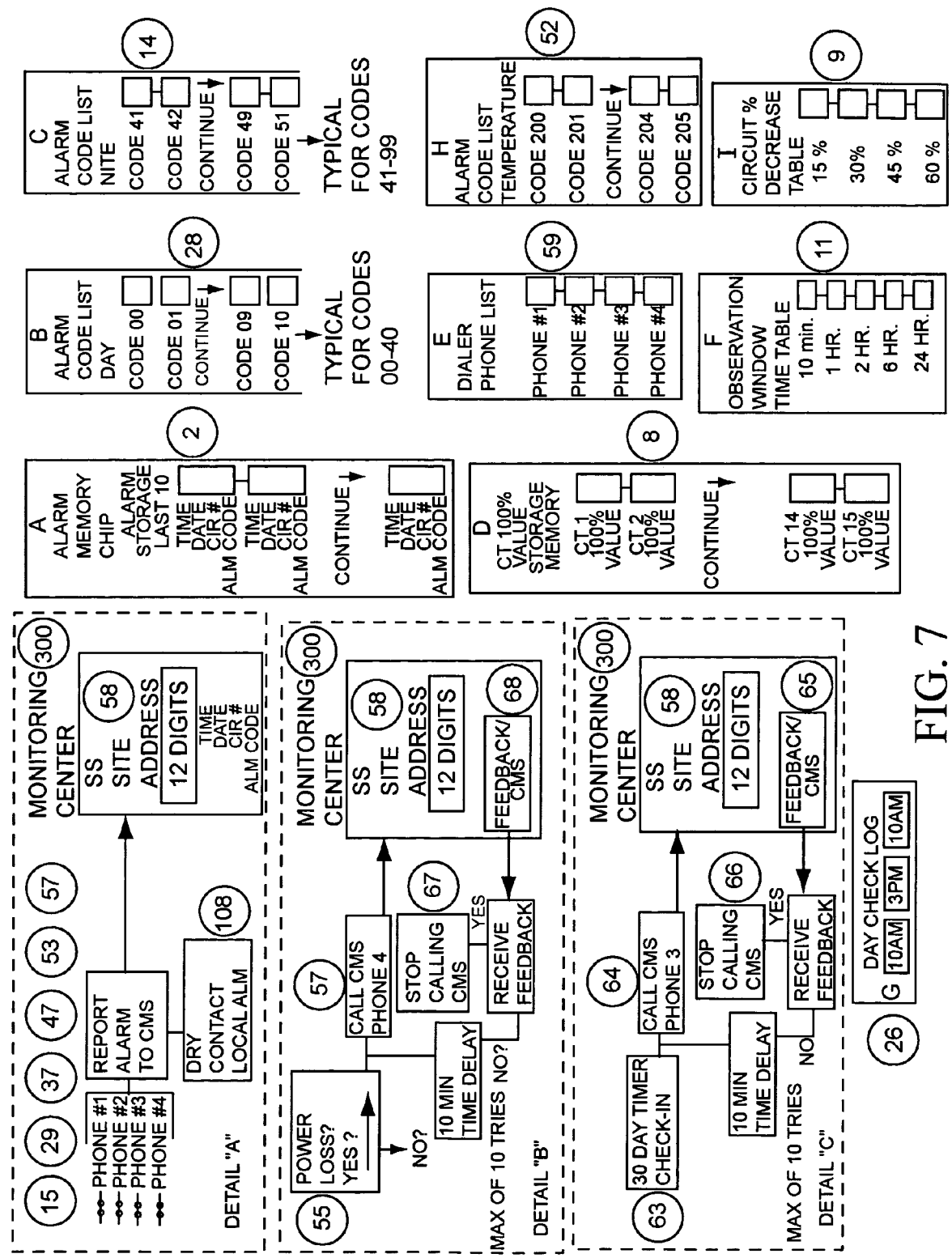
FIG. 7 shows the factory configured tables which store the user defined selection values.

FIG. 7 shows the factory configured tables which store the user defined selection values, and programming menus by which the user-determined input data is keyed in. A running queue of alarms are stored by processor 130 in memory shown at Position A, for example, the ten most recent alarms are stored in a first-in-first out basis. This allows a printout of a recent alarm history for insurance or claim purposes.

Daytime alarm codes are stored sequentially as seen at position B, and nighttime codes are likewise stored at position C. Current 100% baseline values are stored incrementally as shown at position D, a phone number lookup list is stored as seen at position E, user selectable incremental observation window time periods are stored sequentially at F, the incremental daytime check times are stored at G, temperature alarm codes are stored at H, and user selectable incremental current decrease percentages are stored at position I. This format of sequential list storage eases the programming process with keypad data entry device 104, allowing a technician to simply scroll through the incremental values using the keypad data entry device 104 and select those that are appropriate.

The above-described system offers an affordable alternative to commercial signage monitoring due to its simplicity, fault diagnostic capabilities, and the ability to send detailed fault codes to a full service monitoring station defining the site location, affected circuit, and nature of the problem for each monitored circuit. This ensures that commercial property owners can act immediately to maintain the aesthetics of their establishment as well as avoid liability for compromised safety in dimly lit areas.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, the Sign Sentry can be adapted to modify any number of sensors, and the sensors can be adapted to monitor other fault conditions (other than current load reductions). It is to be understood, therefore, that the invention may be practiced otherwise than as specifically set forth in the appended claims.

We claim:

1. A monitoring system for monitoring exterior signage at a site, comprising:

a monitoring panel enclosing a printed circuit board containing a processor in communication with memory, an analog-to-digital transducer, and a modem, said modem also being connected to a telephone line;

at least one current sensor inductively coupled to an existing lighting circuit of said exterior signage for sensing a current level therein, said current sensor being coupled to the analog-to-digital transducer in said monitoring panel for converting said sensed current level to a digitized current level;

a software program resident in said memory for instructing said processor to measure the digitized current level, determine whether said measurement is during a predetermined daytime interval or nighttime interval, if made during said daytime interval to compare said digitized current level to a predetermined minimal current threshold to ensure that said lighting circuit is off during said daytime interval, if said measurement is made during said nightime interval to compare said digitized current level to an upper current threshold and lower current threshold to ensure that said lighting circuit is on and drawing normal current during said nighttime interval, to generate and store an error code in said memory if said comparison fails, said fault code comprising an indication of the site, affected lighting circuit, and nature of the fault, and for activating said modem to dial a central monitoring station and transmit said error code thereto for reporting to appropriate persons responsible for said site.

2. The monitoring system according to claim 1, wherein said at least one current sensor comprises a current amplified sensor for sensing current within a range of 0 to 30 amperes and for outputting a signal between 0 to 0.333 millivolts in proportion to the current range.

3. The monitoring system according to claim 1, further comprising at least one remote current sensing module for monitoring remote exterior signage, said remote current sensing module further comprising a current sensor inductively coupled to an existing lighting circuit of said remote signage for sensing a current level therein, a current relay coupled to said current sensor for comparing said sensed current level to an upper current threshold and lower current threshold and for indicating a result, and an RF transmitter coupled to said current relay for transmitting said result to said monitoring panel;

said monitoring panel further enclosing an RF receiver coupled to said microprocessor receiving and communicating said comparison result thereto.

4. The monitoring system according to claim 1, further comprising a thermostat connected to said monitoring panel and to said processor for communicating ambient indoor site temperature thereto;

said software program resident in said memory instructing said processor to compare said ambient indoor site temperature to a predetermined minimal temperature threshold during a predefined cold-weather cycle to ensure that site heating is functional, and to a predetermined maximum temperature threshold during a predefined warm-weather cycle to ensure that site air-conditioning is functional.

5. A monitoring system for monitoring exterior signage at a site, comprising:

a monitoring panel enclosing a printed circuit board containing a processor in communication with memory, an analog-to-digital transducer, and a modem, said modem also being connected to a telephone line;

a plurality of current sensor each inductively coupled to an existing lighting circuit of said exterior signage for sensing a current level therein, said current sensors each being coupled to a corresponding analog-to-digital transducer in said monitoring panel for converting said sensed current levels to digitized current levels;

a software program resident in said memory for instructing said processor to sequentially poll said analog-to-digital transducers to measure the digitized current levels at said current sensors, to determine whether said measurement are during a predetermined daytime interval or nighttime interval, if during said daytime interval, to compare said digitized current levels to predetermined minimal current thresholds for each of said lighting circuits to ensure that none of said lighting circuits are off during said daytime interval, or if said measurement is made during said nightime interval to compare each of said digitized current levels to an upper current threshold and lower current threshold established for each said lighting circuit to ensure that said lighting circuit is on and drawing normal current during said nighttime interval, to generate and store an error code in said memory if any of said comparisons fail, said fault code comprising an indication of the site, affected lighting circuit, and nature of the fault, and for activating said modem to dial a central monitoring station and transmit said error code thereto for reporting to appropriate persons responsible for said site.

6. The monitoring system according to claim 5, wherein said plurality of current sensors each comprise a current amplified sensor for sensing current within a range of 0 to 30 amperes and for outputting a signal between 0 to 0.333 millivolts in proportion to the current range.

7. The monitoring system according to claim 5, further comprising a plurality of remote current sensing modules for monitoring remote exterior signage, said remote current sensing modules each further comprising a current sensor inductively coupled to an existing lighting circuit of said remote signage for sensing a current level therein, a current relay coupled to said current sensor for comparing said sensed current level to an upper current threshold and lower current threshold and for indicating a result, and an RF transmitter coupled to said current relay for transmitting said result to said monitoring panel;

said monitoring panel further enclosing a corresponding plurality of RF receivers each coupled to said microprocessor receiving and communicating said comparison results thereto.

8. The monitoring system according to claim 5, further comprising a thermostat connected to said monitoring panel and to said processor for communicating ambient indoor site temperature thereto;

said software program resident in said memory instructing said processor to compare said ambient indoor site temperature to a predetermined minimal temperature threshold during a predefined cold-weather cycle to ensure that site heating is functional, and to a predetermined maximum temperature threshold during a predefined warm-weather cycle to ensure that site air-conditioning is functional.

9. A method for monitoring exterior signage at an interior junction box supplying current to said signage by use of a monitoring panel mounted proximate said junction box, said monitoring panel enclosing a printed circuit board containing a processor in communication with memory, at least one current sensor attached in said junction box and connected therefrom to said printed circuit board, and a modem connected to a telephone line, comprising the steps of:

programming said processor to distinguish a nighttime interval and a daytime interval;

operating said processor to test the lighting circuit of said exterior signage for both undercurrent and overcurrent conditions during said nighttime interval and to compile a nighttime fault code upon detecting a failure, said code comprising an indication of the site, affected lighting circuit, and nature of the fault;

operating said processor to test the lighting circuit of said exterior signage for a current condition during said daytime interval and to compile a daytime fault code upon detecting a failure said code comprising an indication of the site, affected lighting circuit, and nature of the fault;

operating said processor to activate said modem to dial a central monitoring station and transmit said fault code thereto for reporting to appropriate persons responsible for said site.

* * * * *